UNITED STATES PATENT OFFICE.

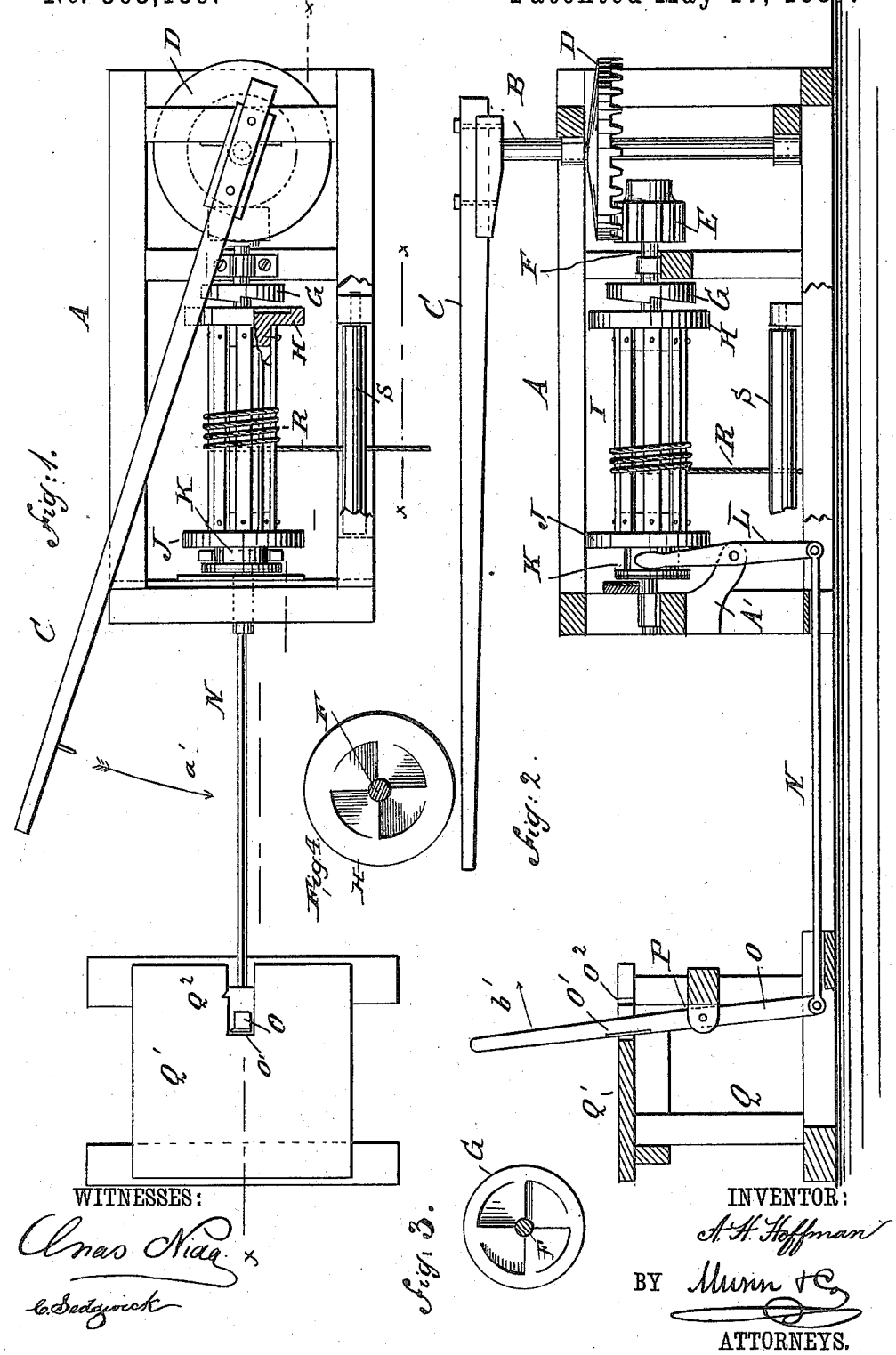

ABSALOM H. HOFFMAN, OF LITTLETON, IOWA.

HORSE-POWER FOR STACKERS.

SPECIFICATION forming part of Letters Patent No. 363,139, dated May 17, 1887.

Application filed January 25, 1887. Serial No. 225,459. (No model.)

*To all whom it may concern:*

Be it known that I, ABSALOM H. HOFFMAN, of Littleton, in the county of Buchanan and State of Iowa, have invented a new and Improved Horse-Power for Stackers, of which the following is a full, clear, and exact description.

The invention consists in the construction and arrangement of various parts, and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a plan view of my improvement, with parts in section. Fig. 2 is a sectional side elevation of the same on the line $x$ $x$ of Fig. 1. Fig. 3 is a face view of the clutch-collar. Fig. 4 is a face view of the clutch-flange on the drum.

On the frame A, of suitable construction, is mounted the vertical shaft B, carrying on its upper end the horizontal lever C, on the outer end of which is hitched, in any suitable manner, a team of horses, which pull on the lever C in the direction of the arrow $a'$, and thus impart a revolving motion to the said shaft B. On the latter is secured a bevel or crown wheel, D, meshing into the bevel-pinion E, secured on the horizontal shaft F, mounted to revolve in suitable bearings secured to the frame A. On the shaft F is secured the clutch-collar G, adapted to engage the clutch formed on a flange, H, of the drum I, loosely mounted on the said shaft F, and provided on its outer end with a flange, J, having an annular recess, K, in which operates the forked lever L, pivoted on the arm A' of the frame A, and connected at its lower end, by the link N, with the upright lever O, fulcrumed on an arm, P, of the frame Q, of suitable construction, and placed at such a distance from the frame A as to permit the team of horses hitched to the lever A to pass conveniently between the said frames A and Q.

The lever O projects above and through a slot in the table Q', and carries a catch, O', adapted to engage a notch, $Q^2$, in the table Q', so as to hold the drum I in clutch-contact with the clutch-collar G.

On the drum I is wound one end of the rope R, which passes under the roller S, mounted on one side of the frame A, and then the rope passes under a pulley placed at the bottom of the barn or other place where the hay is to be stacked. The rope R then passes upward and over another pulley located above, and the other free end of the rope carries the fork or other suitable carrier on which the hay or other material to be stacked is held.

The operation is as follows: A continuous rotary motion is imparted to the shaft B by the team of horses hitched to the lever C and walking around the frame A in a circle. The rotary motion of the shaft B is imparted to the shaft F and its clutch-collar G by means of the gear-wheels D and E. The clutch-collar G, being secured on the shaft F, revolves with the latter, and the drum I is held disengaged from the said clutch-collar G as long as desired by the operator. The hay or other material is fastened to the device on the loose end of the rope R, and the latter is wound upon the drum I as soon as the operator throws the lever O forward in the direction of the arrow $b'$, whereby the drum I is moved to the right and its clutch-flange H engages the revolving clutch G. The winding up of the rope R on the drum I raises the load on the other end of the rope to the desired height and place, and the operator now moves the lever O in the direction of the arrow $b'$, so that the drum I is disengaged from the clutch-collar G, and the rope R unwinds from the drum I by the weight of the fork or other gripping device on the free end of the rope R, which free end of the rope again descends and can again be loaded. The above operation is then repeated. The lever O in its forward position is locked by moving the lever slightly sidewise so that its catch O' engages the notch $Q^2$.

Having thus described my invention, what I claim as new, and desire to secure by Letters Patent, is—

A horse-power for stackers, comprising the frame A, the vertical shaft B, the sweep C, and crown-wheel D thereon, the horizontal shaft F, having the pinion E meshing with wheel D, the clutch-collar G, fixedly secured to the shaft F, the drum I, loosely mounted on the shaft and having the clutch-flange H at the end next to the clutch-collar G, and the recessed flange J K at its opposite end, the vertical-forked lever L, pivoted between its ends to the frame and engaging the recessed flange J K, the slotted frame Q, the upright lever O, having a locking catch, and the rod N, connecting the lower ends of levers O L, substantially as set forth.

ABSALOM H. HOFFMAN.

Witnesses:
RUSH C. LAKE,
M. W. HARMON.